R. H. FOX.
BALL BEARING.
APPLICATION FILED NOV. 29, 1915. RENEWED DEC. 13, 1916.
1,213,089.
Patented Jan. 16, 1917.
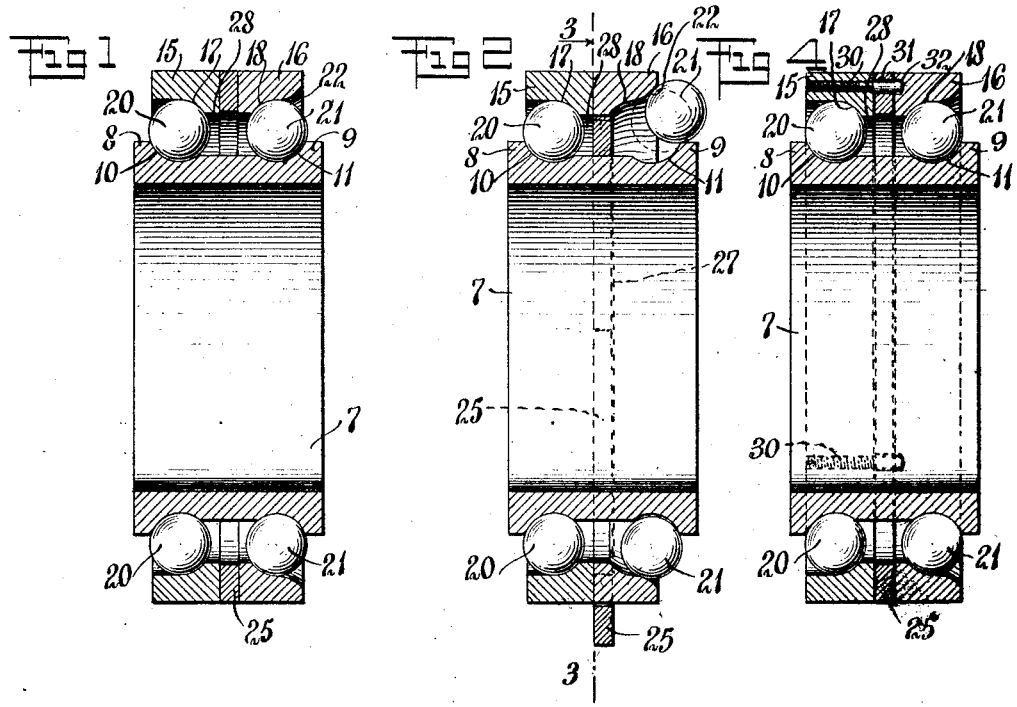
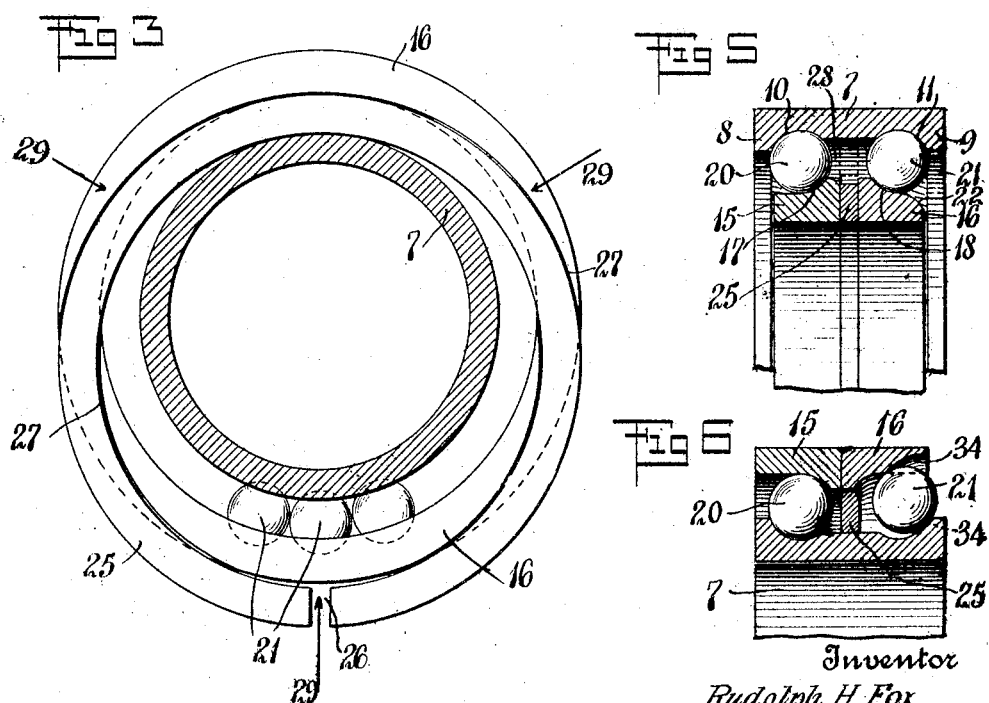
Inventor
Rudolph H. Fox
By his Attorneys

UNITED STATES PATENT OFFICE.

RUDOLPH H. FOX, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

BALL-BEARING.

1,213,089. Specification of Letters Patent. Patented Jan. 16, 1917.

Application filed November 29, 1915, Serial No. 63,939. Renewed December 13, 1916. Serial No. 136,652.

*To all whom it may concern:*

Be it known that I, RUDOLPH H. Fox, a citizen of the United States of America, residing at New Britain, Connecticut, have invented a new and useful Ball-Bearing, of which the following is a specification.

My present invention relates particularly to ball bearings of the double row type, and the general objects of the invention are to simplify and improve bearings of this character.

A special object is to facilitate the assemblage of the balls in the two race-ways, and to accomplish this without weakening the structure.

Another object it to enable the adjustment of the bearing members to compensate for wear and to take up any looseness in the bearing.

In the accomplishment of these and other objects, I employ a member having annular shoulders facing toward each other and forming opposed ball tracks, and in connection with this member, a pair of concentrically arranged bearing members having ball tracks confronting the ball tracks on the shouldered member and forming in connection therewith two race-ways for the balls. The two bearing members are normally held separated by a so-called spreading member which serves to maintain the ball tracks thereon in operative relation to the ball tracks on the shouldered member. The removal or displacement of this spreading member enables one bearing member being shifted axially toward the other bearing member, to facilitate entrance of the balls into the second race-way. The spreading member may be in the form of a ring of proper thickness, or in the form of spreading screws carried by one of the bearing members and engaging the other bearing member, or both devices may be employed. In the latter case the screws serve to maintain the spreading ring in place. The use of the spreading screws has the advantage that the bearing members may be set to accommodate themselves to slight variations in size in the balls or the load carrying members.

Other features and the details of construction will appear as the specification proceeds, and will be made clear by a consideration of the accompanying drawing which illustrates the invention embodied in a practical and preferred form.

In this drawing: Figure 1 is a sectional view of the complete assembled bearing. Fig. 2 is a similar view showing the spreading ring dropped down and the second bearing ring shifted over against the first bearing ring to permit insertion of the second row of balls. Fig. 3 is a view taken substantially on the line 3—3 of Fig. 2 illustrating the displacement of the spreading ring and the manner in which it seats in one bearing ring, so as to constitute no impediment to the axial displacement of the other bearing ring. Fig. 4 is a view similar to Fig. 1 illustrating the use of the spreading and spreading-ring-locking-screws. Fig. 5 is another sectional view illustrating a reverse arrangement of the shouldered member and bearing rings. Fig. 6 is a fragmentary view similar to Fig. 1 illustrating a full width bearing and showing the use of a filling opening.

In the illustration, the shouldered bearing member is designated 7, said member having two spaced apart annular ribs or shoulders 8 and 9, faced on their opposing sides with ball tracks 10 and 11. The bearing members are in the form of two rings 15 and 16 concentrically disposed with respect to the shouldered member, and having ball tracks 17 and 18 respectively, confronting the ball tracks 10 and 11 on the shouldered member.

The bearing members may be located either outside or inside the shouldered member. In Figs. 1 to 4 and 6, the bearing members are shown as surrounding the shouldered member, and in Fig. 5 the reverse arrangement is shown with the bearing members located inside the shouldered member. In both the constructions the bearing members are separated by an intervening space, which space may be sufficient to enable the second bearing member being shifted axially, far enough to admit the second row of balls into the second race-way. This feature will perhaps be best understood by a consideration of Fig. 2. Here the first row of balls 20 have been engaged in the first race-way between the confronting ball tracks 10 and 17, as can readily be done by simply displacing the first bearing ring 15 to the right, far enough to admit the balls into this race-way, and the second bearing ring 16 is shown displaced axially toward the first bearing ring so as to open up a passage way for the second series of balls into the second race-way.

One of the balls 21 of the second series is shown being entered into the race-way at the upper right hand corner of Fig. 2, the passage of the balls into the race-way being indicated by the dotted lines. If it is desired, the edge of the bearing ring or the edge of the track on the shouldered member may be relieved or cut-away somewhat as indicated at 22 to facilitate the entrance of the balls. This relieving, in the illustration, amounts to a bare rounding off of the corners and does not appreciably weaken the structure and is more in the nature of a convenience to facilitate the entrance of the balls, as it will be apparent that it is not necessary when the space between the bearing rings is sufficient to enable the second bearing ring being shifted over far enough to entirely open up the second race-way.

After the two rows of balls are in place in their race-ways, the bearing rings are forced apart and held in their spaced apart relation by a suitable spreading device. A simple and effective means for this purpose is the spreading ring shown at 25, and consisting of a ring of substantially the same diameter as the bearing rings and of a thickness to fill the space between the bearing rings, and hold said rings spaced apart with the ball tracks thereon in proper confronting relation to the ball tracks on the shouldered member. This spreading ring may be cut through at one point, as indicated at 26 in Fig. 3, to permit the ring being sprung into place over the bearing rings after all the balls have been inserted. The necessity for springing the spreading ring into place, however, is avoided in the present disclosure by providing recesses 27 in one or both of the opposing faces of the two bearing rings to receive the spreading ring at the point where said ring overlaps the bearing rings when the spreading ring is dropped down in the ring inserting position indicated in Figs. 2 and 3. In the illustration these recesses for the spreading ring are shown provided in the second bearing ring.

The parts are usually assembled by first bringing the first bearing ring into proper concentric relation with the shouldered member and engaging the set of balls in the first race-way, then applying the one-piece spreading ring and dropping it down or displacing it radially so that it will not impede the movement of the second bearing ring toward the first bearing ring, and then applying the second bearing ring. After applying the second bearing ring and displacing it toward the other bearing ring and inserting the second row of balls, the bearing rings are forced apart to admit the spreading ring and the spreading ring is forced into position between the two bearing rings to maintain them in their proper relation to the shouldered member.

In order to maintain a proper running engagement of the parts after the bearing has been assembled, the spreading ring should be of a thickness to hold the bearing rings firmly spaced apart and with the ball tracks thereon in firm engagement with the balls. Considerable force is therefore usually necessary in engaging this full-thickness spreading ring between the bearing rings and the friction resulting from this pressure ordinarily is sufficient to prevent displacement of the spreading ring when once engaged between the bearing rings.

One method of forcing the bearing rings apart preparatory to the insertion of the spreading ring therebetween is to insert wedges between the rings at the three equidistantly spaced points indicated at 29 in Fig. 3, the lower wedge being entered in this case through the break 26 in the displaced spreading ring. With the rings held apart by these wedges the spreading ring is then forced into position between the rings, the two upper wedges being forced out by the entering spreading ring. The pressure under which these parts are assembled constitutes the three parts practically a single unit, and by reason of the fact that the spreading ring is made in a single piece and so can be formed accurately the same thickness throughout the bearing rings are spread uniformly apart throughout and are maintained in this relation.

In the form shown in Figs. 1 to 4, the spreading ring should be made of large enough internal diameter to be readily slipped over the annular shoulder on the inside bearing member, and the space indicated at 28 between the outer circumference of the inside bearing member and the inner circumference of the bearing rings, should be sufficient to receive the spreading ring when the same is dropped down to permit the assemblage of the parts, as clearly indicated in Fig. 2. This same clearance should be provided in the reverse arrangement illustrated in Fig. 5, the dotted lines indicating the displacement of the spreading ring to permit the assemblage of the parts.

Upon installation of the bearing, the spreading ring is locked against displacement in the first form of the invention illustrated by the surrounding wall of the seat in which the bearing rings are engaged, and in the second form of the invention illustrated, by the shaft on which the bearing rings are engaged.

To lock the spreading ring against displacement when the bearing is being handled as a unit and before it has been installed, special means for securing the spreading ring may be provided. In the illustration, Fig. 4, the securing screws 30 are provided for this purpose, said screws being carried by the first bearing ring and engaging in openings 31 in the spreading ring.

By extending the screws 30 on through the spreading ring and into engagement with the other bearing ring, it will be apparent that these screws may be used also as means for forcing the bearing rings apart. In Fig. 4 it will be noted that these screws extend into seats 32 in the far bearing ring, and that by setting up the screws the bearing rings may be forced apart to bring them into proper coöperation with the balls, or to compensate for slight wear or inequalities in the parts.

The spreading screws may, if desired, be used as the sole means for spreading the bearing rings apart, in which case said screws will be disposed at different points about the circumference of the ring, three equidistantly spaced spreading screws for instance, being used in the form shown in Fig. 4, two of which screws appear in this view.

The form of the bearing illustrated in Fig. 6 is similar to that shown in Fig. 1 except that both the inner and the outer bearing members are in this case of the same width. This full-width type of bearing is usually easier to mount in place but with this type filling openings may be necessary for the last row of balls, as indicated at 34.

The bearings illustrated are of the full-race type, but it will be apparent that a fewer number of balls may be employed with suitable spacers for holding the balls properly spaced, and it will, furthermore, be apparent that other changes and modifications may be made without departing from the real spirit and scope of the invention.

What I claim is:

1. A ball bearing comprising a bearing member having annular shoulders facing toward each other and providing opposed ball tracks, a pair of bearing rings concentrically disposed with respect to said shouldered ring member and having ball tracks confronting the ball tracks on said shouldered member, said bearing rings being movable bodily toward each other to admit a row of balls between confronting sets of the ball tracks, a spreading ring engaged between the bearing rings and holding the same spread apart with the ball tracks thereon in proper coöperative relation with the confronting ball tracks on the shouldered member, said spreading ring being radially displaceable from in between the bearing rings to permit the bodily movement of said bearing rings toward each other, and one of said rings having recesses in the face thereof at the points where the spreading ring and bearing rings overlap when said spreading ring is radially displaced, whereby to permit the bearing rings being moved toward each other far enough to admit the row of balls aforesaid.

2. A ball bearing comprising a bearing member having annular shoulders facing toward each other and providing opposed ball tracks, a pair of bearing members concentrically arranged with respect to said shouldered bearing member and having ball tracks confronting the ball tracks on said shouldered bearing member, said bearing members being displaceable axially toward each other to admit a row of balls between a confronting set of ball tracks, a spreading member made in a single piece and engaged under pressure between said bearing members and holding the same spread apart with the ball tracks thereon in proper coöperative relation with the confronting ball tracks on the shouldered bearing member, one of said members having means for enabling the displacement of said one-piece spreading member from its spreading position in between said bearing members to permit said bearing members being brought toward each other for the purpose of opening up the ball raceways.

3. A ball bearing comprising a ring member having annular shoulders facing toward each other and providing opposed ball tracks, a pair of bearing rings concentrically arranged with respect to said shouldered ring member and having ball tracks confronting the ball tracks on said shouldered ring member, said bearing rings being displaceable axially toward each other to admit a row of balls between a confronting set of ball tracks, a spreading ring engaged between said bearing rings and holding the same spread apart with the ball tracks thereon in proper coöperative relation with the confronting ball tracks on the shouldered ring member, and detachable means for securing said spreading ring against displacement from between the bearing rings.

4. A ball bearing comprising a ring member having annular shoulders facing toward each other and providing opposed ball tracks, a pair of bearing rings concentrically arranged with respect to said shouldered ring member and having ball tracks confronting the ball tracks on said shouldered ring member, said bearing rings being displaceable axially toward each other to admit a row of balls between a confronting set of ball tracks, a spreading ring engaged between said bearing rings and holding the same spread apart with the ball tracks thereon in proper coöperative relation with the confronting ball tracks on the shouldered ring member, and a securing screw engaged in one of the bearing rings and engaging the spreading ring to thereby hold said spreading ring against displacement from between the bearing rings.

5. A ball bearing comprising a member having oppositely facing annular shoulders providing opposed ball tracks, a bearing member arranged in concentric relation to said shouldered member having a ball track confronting one of the tracks on the shouldered member and forming in connection therewith a race-way for a row of balls, a row of balls in said race-way, a second concentric bearing member separated from and independent of the first bearing member, having a ball track confronting the other ball track of the shouldered member and forming in connection therewith a race-way for a second row of balls, and a plurality of spreading screws mounted in one of said bearing members and projecting laterally therefrom into engagement with the adjoining face of the other bearing member.

6. A ball bearing comprising a member having oppositely facing annular shoulders providing opposed ball tracks, a bearing member arranged in concentric relation to said shouldered member having a ball track confronting one of the tracks on the shouldered member and forming in connection therewith a race-way for a row of balls, a row of balls in said race-way, a second concentric bearing member separated from and independent of the first bearing member, having a ball track confronting the other ball track of the shouldered member and forming in connection therewith a race-way for a second row of balls, a row of balls in said second race-way and a spreading member interposed between said bearing members and holding said members apart with the tracks thereon in operative relation to the opposed tracks on the shouldered member, one of said bearing members having a recess therein receiving said spreading member when the same is displaced from between the bearing members to thereby permit axial displacement of one bearing member in respect to the other bearing member.

7. A ball bearing comprising a bearing member having annular shoulders facing toward each other and providing opposed ball tracks, a pair of bearing rings concentrically disposed with respect to said shouldered ring member and having ball tracks confronting the ball tracks on said shouldered member, said bearing rings being movable bodily toward each other to admit a row of balls between confronting sets of the ball tracks, a spreading ring engaged between the bearing rings and holding the same spread apart with the ball tracks thereon in proper coöperative relation with the confronting ball tracks on the shouldered member, said spreading ring being radially displaceable from in between the bearing rings to permit the bodily movement of said bearing rings toward each other, and one of said bearing rings having recesses in the face thereof at the points where the spreading ring overlaps said bearing ring when said spreading ring is radially displaced, whereby to prevent the spreading ring from obstructing the movement of the bearing rings toward each other.

8. A ball bearing comprising a bearing member having annular shoulders facing toward each other and providing opposed ball tracks, a pair of bearing rings concentrically disposed with respect to said shouldered ring member and having ball tracks confronting the ball tracks on said shouldered member, said bearing rings being movable bodily toward each other to admit a row of balls between confronting sets of the ball tracks, a spreading ring engaged between the bearing rings and holding the same spread apart with the ball tracks thereon in proper coöperative relation with the confronting ball tracks on the shouldered member, said spreading ring being radially displaceable from in between the bearing rings to permit the bodily movement of said bearing rings toward each other, one of said bearing rings having recesses in the face thereof at the points where the spreading ring overlaps said bearing rings when said spreading ring is radially displaced, whereby to prevent the spreading ring from obstructing the movement of the bearing rings toward each other, and screws engaged in one of the bearing rings and extended through the spreading ring and into engagement with the other bearing ring.

9. A bearing comprising, a channeled member having annular shoulders facing toward each other to provide thrust receiving ball tracks, a pair of bearing members concentrically arranged with respect to said channeled member and having annular ball tracks confronting the ball tracks of said channeled member, said bearing members being displaceable axially toward each other to permit balls to be introduced between confronting ball tracks, two sets of balls between the confronting sets of ball tracks and spreading means for said bearing members comprising a hard metal insertible and removable one-piece spreading member interposed between said bearing members to hold the same spaced apart to maintain the respective ball tracks thereon in proper operative relation with the confronting ball tracks on the channeled bearing member, said parts being constructed to enable the insertion of said one-piece spreading member into its spreading position in between said bearing members to permit of the assembling of said bearing.

10. A ball bearing comprising a bearing member provided with two spaced ball races, a coöperating bearing member composed of a plurality of pieces each constructed to provide a ball race to coöperate with one of the ball races of the first mentioned member, the two parts of said second bearing member being axially movable toward each other to permit of the insertion of balls between the respective bearing members, and a hard metal insertible and removable one-piece spacing member insertible into the space between the two parts of said second bearing member to position the latter in the proper operative ball bearing relation to the first bearing member when said spacing member is in place between the two parts of the second bearing member.

RUDOLPH H. FOX.